(12) United States Patent
Lawson

(10) Patent No.: US 9,102,052 B2
(45) Date of Patent: Aug. 11, 2015

(54) CONTROL SYSTEM FOR AN ARTICULATED MANIPULATOR ARM

(75) Inventor: Nicholas Alexander Lawson, Kirkbymoorside (GB)

(73) Assignee: Forum Energy Technologies (UK) Limited, Aberdeen (GB)

( * ) Notice: Subject to any disclaimer, the term of this patent is extended or adjusted under 35 U.S.C. 154(b) by 1805 days.

(21) Appl. No.: 11/791,496

(22) PCT Filed: Nov. 10, 2005

(86) PCT No.: PCT/GB2005/004328
§ 371 (c)(1),
(2), (4) Date: Dec. 3, 2007

(87) PCT Pub. No.: WO2006/056738
PCT Pub. Date: Jun. 1, 2006

(65) Prior Publication Data
US 2008/0109108 A1    May 8, 2008

(30) Foreign Application Priority Data
Nov. 24, 2004 (GB) .................................. 0425802.6

(51) Int. Cl.
| B25J 13/00 | (2006.01) |
| B25J 3/00 | (2006.01) |
| G06F 7/00 | (2006.01) |
| B25J 3/04 | (2006.01) |
| B25J 9/04 | (2006.01) |
| G05D 3/00 | (2006.01) |

(52) U.S. Cl.
CPC ... *B25J 3/04* (2013.01); *B25J 9/046* (2013.01)

(58) Field of Classification Search
CPC ..................................... B25J 3/04; B25J 9/046
USPC ....................... 74/490.01; 244/234, 236, 237;
403/34–39; 414/5, 730, 909; 606/1,
606/130; 700/213; 901/8, 9
See application file for complete search history.

(56) References Cited

U.S. PATENT DOCUMENTS

| 3,280,991 A | | 10/1966 | Melton et al. |
| 3,608,743 A | * | 9/1971 | Mosher et al. ..................... 414/5 |
| 3,923,166 A | * | 12/1975 | Fletcher et al. .................... 414/4 |
| 4,068,156 A | * | 1/1978 | Johnson et al. ............... 318/575 |
| 4,160,508 A | * | 7/1979 | Salisbury, Jr. ..................... 414/4 |
| 4,509,404 A | * | 4/1985 | Kawahara et al. .............. 91/388 |
| 5,784,542 A | | 7/1998 | Ohm et al. |
| 2001/0018591 A1 | | 8/2001 | Brock et al. |
| 2004/0099081 A1 | | 5/2004 | Riwan et al. |
| 2007/0193442 A1 | * | 8/2007 | McCoy, Jr. ...................... 91/459 |
| 2007/0205739 A1 | * | 9/2007 | McCoy, Jr. ............... 318/568.21 |

FOREIGN PATENT DOCUMENTS

| JP | 2-279285 | 11/1990 |
| JP | 02279285 A | 11/1990 |

* cited by examiner

*Primary Examiner* — Khoi Tran
*Assistant Examiner* — Dale Moyer

(57) ABSTRACT

A control system for an articulated manipulator arm, the manipulator arm having at least three degrees of freedom, the control system including a master controller moveable to replicate the at least three degrees of freedom of the manipulator arm; the control system determining the rate of movement of the master controller in each direction replicating a degree of freedom of the manipulator arm and controlling actuation of the manipulator arm so that the rate of movement of the manipulator arm in each of the at least three degrees of freedom is proportional to the rate of movement of the master controller in each direction replicating a degree of freedom of the manipulator arm.

10 Claims, 3 Drawing Sheets

CONTROL SYSTEM FOR AN ARTICULATED MANIPULATOR ARM

The present invention relates to a control system for an articulated manipulator arm, the manipulator arm having at least three degrees of freedom, preferably including at least two of a pivot axis, a rotational axis and a translational axis. Every joint or moveable axis on the manipulator arm is referred to as a degree of freedom.

Manipulator arms are frequently used to perform operations that a person is unable to carry out unassisted or in environments that are too hazardous and/or inhospitable for the presence of a human operator, such as in deep sea or offshore operations, areas exposed to high levels of radiation or extra-terrestrial environments. Such manipulator arms are usually controlled by a human operator working in a safe location remote from the manipulator arm, usually viewing the manipulator arm and its surroundings via a video link.

Manipulator arms are used on subsea vehicles known as ROVs (remotely operated vehicles). ROVs are used for a variety of purposes, including salvage and rescue operations, pipeline laying and maintenance operations and other subsea activities at depths far beyond that which can be reached by divers. Such devices commonly operate at depths of 3000 meters or more. The manipulator arm, and other functions of an ROV are usually remotely controlled by an operator on a surface vessel from which the ROV is deployed.

A typical manipulator arm is shown in FIG. 1. The manipulator arm 1 comprises a base 2 mountable on a structure, such as the body of an ROV, an upper arm segment 3 pivotally attached to the base 2 for rotation about a shoulder slew axis A and a shoulder pitch axis B, a first forearm segment 4 pivotally attached to the upper arm segment 3 for rotation about an elbow pitch axis C, a second forearm segment 5 rotatably mounted on the first forearm 4 segment for rotation about a forearm rotation or roll axis D, a wrist segment 6 pivotally connected to the second forearm segment 5 for rotation about a wrist pitch axis E and a tool segment 7, having an object manipulating tool comprising a pair of opposed jaws 8 mounted thereon, the tool segment 7 being rotatably connected to the wrist segment 6 to permit rotation of the tool about a tool rotational axis F, the jaws of the object handling tool being moveable between open and closed positions. Such arrangement provides six degrees of freedom providing a large operational envelope allowing a wide range of manipulation operations to be carried out.

Movement of the manipulator arm is usually driven by hydraulic actuators (not shown), commonly a combination of double acting hydraulic cylinders and rotary actuators connectable to a source of pressurised hydraulic fluid by means of electrically operated hydraulic solenoid valves. Each hydraulic actuator is usually associated with a pair of valves, one for each direction of movement of the actuator. The hydraulic solenoid valves are usually mounted on a valve manifold. When the manipulator arm is mounted on an ROV, the valve manifold and source of pressurised hydraulic fluid is usually mounted on the ROV adjacent the manifold.

There are two main known control systems for controlling the operation of such manipulator arms.

A first control system is commonly known as rate controlled or "bang-bang control". Simple hydraulic solenoid valves are controlled by on-off switches provided at an operator control station. Actuation of a switch causes a selected valve to open, supplying hydraulic fluid to an associated actuator and causing the associated joint of the manipulator arm to move in a selected direction at a fixed speed (limited by the flow rate of the valve and subject to the mechanical geometry) until the switch is released, closing the valve and stopping movement of the associated joint. The switches are usually provided in pairs, associated with a simple joystick or toggle, each pair of switches controlling a pair of valves associated with a single actuator such that movement of the joystick or toggle in one direction causes movement of the associated joint in a first direction and movement of the joystick or toggle in the opposite direction causes movement of the valve in a second direction, opposite to said first direction.

Control systems of the bang-bang type provide slow and crude control of the manipulator arm and are unsuitable where accurate and precise control of the manipulator arm is required. However, such systems are relatively cheap, reliable and are easy to maintain, requiring no wiring or electrical components within the manipulator arm, thus reducing the complexity of the arm thereby minimising the sources of failure within the arm and facilitating maintenance of the arm.

An improvement on the simple bang-bang control system comprises the use of variable rate (proportional) valves in place of fixed rate hydraulic valves whereby the rate of flow of hydraulic fluid to the actuators of the manipulator arm, and thus the speed of movement of the arm, can be controlled. In known variable rate systems the variable rate valves are actuated by means of multi-position switches or potentiometers connected to joy sticks whereby the speed of movement of a joint of the manipulator arm is proportional to the magnitude of movement of the joystick away from its home or rest position. Such systems are more accurate than the simple bang-bang system, but are still difficult and time consuming to use, requiring a separate control input for each joint of the manipulator arm.

A more accurate and intuitive system for controlling a manipulator arm is the use of position feedback control. This enables a master arm to be used to control the manipulator arm (often referred to as the slave arm). The master arm is effectively a model or replica of the manipulator arm, albeit usually on a smaller scale, the master arm having a number of articulated segments interconnected by joints, each joint of the master arm corresponding to a joint of the manipulator arm to be controlled.

Each joint of the master arm has a position sensor, in the form of a potentiometer, connected thereto whereby the position of each segment of the master arm with respect to the adjacent segments can be determined by a controller. Similarly, each joint of the manipulator arm is provided with a position sensor to determine the position of each segment of the manipulator with respect to the adjacent segments.

When each master arm joint is moved, a computerised control system senses the movement and controls the operation of the proportional hydraulic solenoid valves to move the corresponding joints of the manipulator or slave arm by a corresponding or proportional amount, using the output of the position sensors of the manipulator arm to determine when sufficient movement has taken place. Electronic scaling can be used to vary the amount the manipulator arm moves for a given movement of the master arm.

Feedback control systems provide faster and more accurate control of the slave manipulator arm and provide a more intuitive control interface for the operator. However, the need for position sensors in each joint of the manipulator arm leads to a requirement for wiring and other electrical devices within the manipulator arm. In sub-sea applications, such electrical devices need to be protected from the environment in which the arm operates by complex seals and compensation systems (the filling of any voids or spaces within the arm with incompressible fluids). This greatly increases the cost of the manipulator arm, creates numerous sources of unreliability (extensive wiring needs to pass though each joint and continual flexing of the joints leads to breakage of such wiring) and increases the complexity and cost of maintenance procedures. The feedback control system typically requires the use of hydraulic servo valves, which are more expensive and less tolerant to contamination than the simple on-off valves used in bang-bang systems.

An object of the present invention is to provide the reliability and simplicity of the bang-bang control system with the accuracy and intuitive control interface of the feedback control system.

According to the present invention there is provided a control system for an articulated manipulator arm, the manipulator arm having at least three degrees of freedom, said control system comprising a master controller moveable to replicate the at least three degrees of freedom of the manipulator arm; means for determining the rate of movement of the master controller in each direction replicating a degree of freedom of the manipulator arm; and control means for controlling actuation of the manipulator arm whereby the rate of movement of the manipulator arm in each of said at least three degrees of freedom is proportional to the rate of movement of the master controller in each direction replicating a degree of freedom of the manipulator arm.

Preferably said at least three degrees of freedom of the manipulator arm include at least two of a pivot axis, a rotational axis and a translational axis.

In a preferred embodiment, the master controller comprises an articulated master arm having a plurality of arm segments interconnected by joints, each joint of the master arm corresponding to a joint the manipulator arm, the master arm having at least three degrees of freedom corresponding to said at least three degrees of freedom of the manipulator arm such that movement of the master arm can replicate movement of the manipulator arm. The means for determining the rate of movement of the master controller in each direction replicating a degree of freedom of the manipulator arm may comprise, for each joint of the master arm corresponding to a joint of the manipulator arm, means for sensing the relative position of the segments of the master arm on either side of a the joint and computing means for calculating the rate of movement of said segments of the master arm with respect to one another to determine the rate of movement of the master arm about the joint of the master arm replicating a joint of the manipulator.

Preferably the calculating means comprises a differentiator for differentiating the position data from the position sensing means to determine the rate of movement of the segments of the master arm about each joint of the master arm corresponding to a joint of the manipulator arm.

Preferably the control system further comprises a plurality of hydraulic actuators mounted on the manipulator to move the manipulator in each of its at least three degrees of freedom, each hydraulic actuator being connectable to a source of pressurized hydraulic fluid via a variable rate valve, the control means controlling the opening and closing of the variable rate valves to control the rate of movement of the manipulator arm in proportion to the determined rate of movement of the master controller.

The master controller may include means for selectively deactivating the control means to permit movement of the master controller without causing corresponding movement of the manipulator arm.

Preferably the manipulator arm has at least four degrees of freedom. In a preferred embodiment the manipulator arm has at least six degrees of freedom comprising a shoulder yaw, a shoulder pitch, an elbow pitch, a forearm rotation, a wrist pitch and a wrist rotation, the master controller comprising an articulated master arm having at least five degrees of freedom corresponding to the shoulder yaw, shoulder pitch, elbow pitch and forearm rotation of the manipulator arm.

The control system preferably includes means for controlling operation of an object manipulating tool provided at a distal end of the manipulator arm. Preferably the means for controlling the operation of the object manipulating tool also controls the wrist rotation of the manipulator arm. The means for controlling the operation of the object manipulating tool and wrist rotation of the manipulator arm may comprise a single joystick mounted on a distal end of the master arm to permit one handed operation of the master arm.

Somewhat surprisingly, the control system according to the present invention, based on a velocity master slave relationship rather than a positional relationship as with feedback control, has been found to be practically indistinguishable in operation from a feedback control system. The control system according to the present invention is actually more responsive than a feedback control system as no closed position control loops are present. This has the effect of removing any stability issues that can occur in feedback systems and is only limited in response by the finite delay inherent in surface to subsea communications systems, which is not usually noticeable and is present in all subsea manipulator systems.

The system according to the present invention provides fast, accurate and precise control of the manipulator arm while also being as reliable and easy to maintain as bang-bang systems.

An embodiment of the present invention will now be described with reference to the accompanying drawings in which: —

Figure 2:
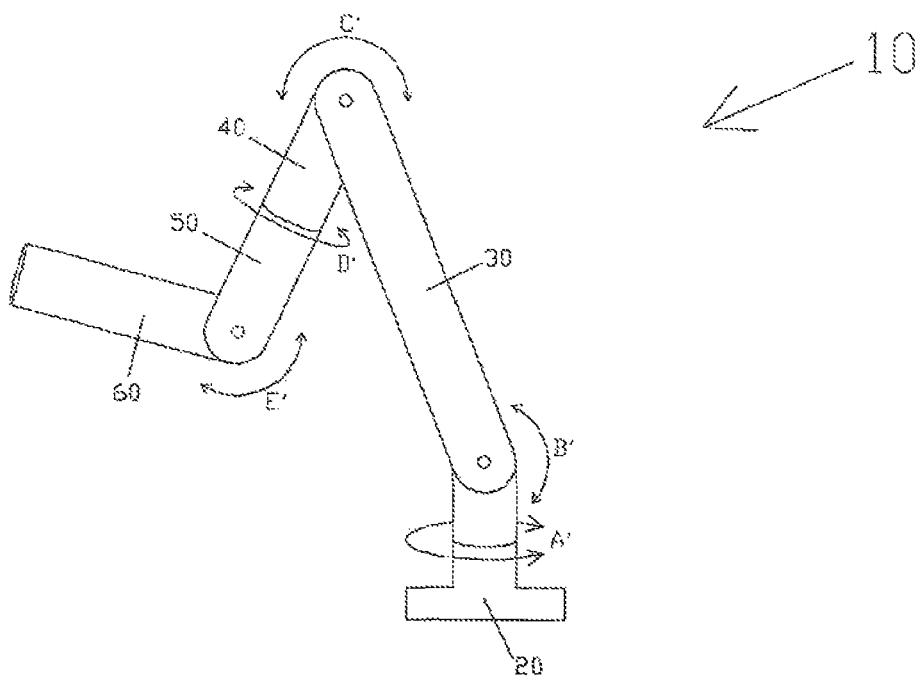
FIG. 2 is a perspective view of a typical master arm for use with an embodiment of the control system of the present invention.

As shown in FIG. 2, the master arm 10 is effectively a model or replica of the manipulator arm 1, known as the slave arm. The master arm 10 has a number of articulated segments 20, 30, 40, 50, 60 interconnected by joints, each joint of the master arm 10 corresponding to a joint of the manipulator or slave arm 1 to be controlled. In the embodiment described herein the master arm 10 comprises a base 20, an upper arm segment 30 pivotally attached to the base 20 for rotation about a shoulder slew axis A' and a shoulder pitch axis B', a first forearm segment 40 pivotally attached to the upper arm segment 30 for rotation about an elbow pitch axis C', a second forearm segment 50 rotatably mounted on the first forearm 40 segment for rotation about a forearm rotation or roll axis D' and a wrist segment 60 pivotally connected to the second forearm segment 5 for rotation about a wrist pitch axis E'. Each of the pivot and rotational axes A',B',C',D',E' of the master arm correspond to an axis of movement (i.e. a joint) of the manipulator arm.

The wrist segment 60 of the master arm 10 is provided with further control means for controlling the rotation of the object manipulating tool of the manipulator arm about the tool rotational axis F and for controlling the operation of the jaws of the object manipulating tool.

Obviously other designs of master arm are envisaged depending on the type of manipulator arm which is to be controlled. Other arms may have different arrangements with more or less degrees of freedom and may have one or more translational axis of movement in addition to, or instead of rotary or pivotal axes.

A position sensor 15, in the form of a potentiometer, is provided on each joint of the master arm 1, the output of the each position sensor 15 being fed to a computer 100 (see FIG. 3) which provides a control signal for the manipulator arm controller 200 which in turn controls operation of the manipulator arm actuator 300.

A position sensor 15 other than a potentiometer may be used at each joint of the master arm.

Figure 1:
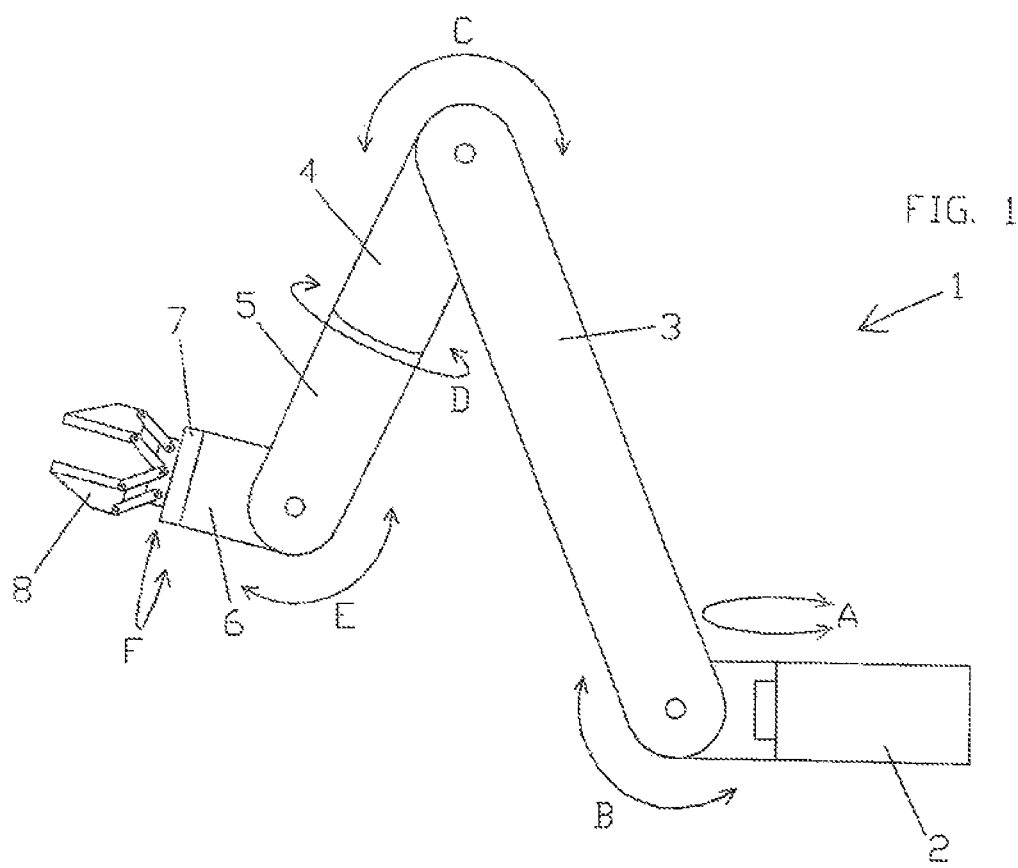
FIG. 1 is a perspective view of a typical manipulator arm, as discussed above.

The master arm 10 provides a particularly intuitive and easy to use control interface for the operator. However, master arms have only been suitable in the past for position feedback control devices. The control system according to the present invention permits the use of a master arm as shown in FIG. 2 to control a manipulator arm of the type shown in FIG. 1, without requiring the manipulator arm to be provided with any position determining means, such as potentiometers or other position sensing electronics (i.e. no position feedback from the manipulator arm is required).

Figure 3:
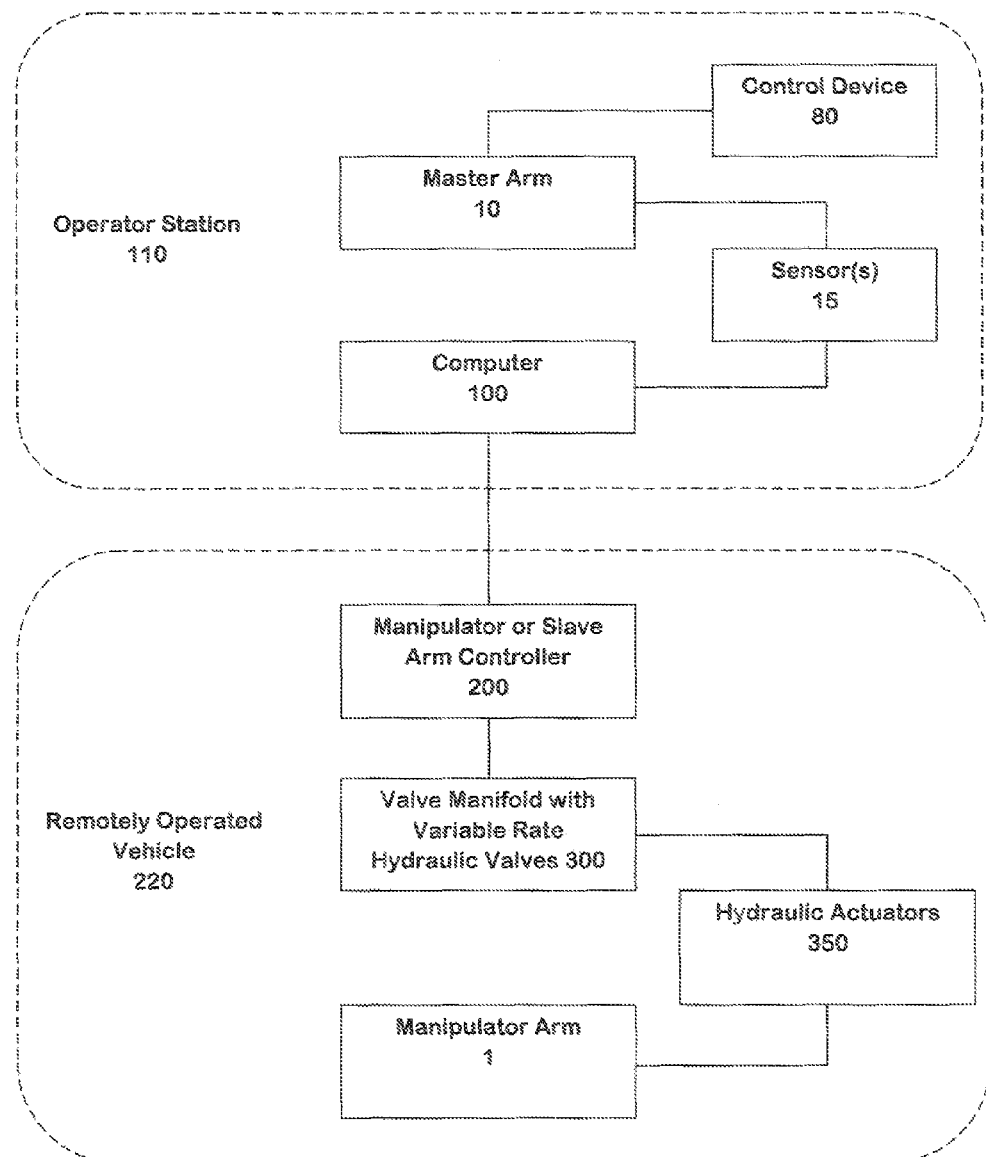
FIG. 3 is a schematic illustration of a control system according to an embodiment of the present invention.

FIG. 3 is a schematic illustration of a manipulator arm control system according to an embodiment of the present invention. The master arm 10 and computer 100 are provided at an operator station 110. When the manipulator arm 1 is mounted on an ROV 220, the operator station 110 would be provided on a surface vessel from which the ROV is deployed, the operator station 110 being connected to the ROV 220 by a communications link.

Movement of the manipulator arm 1 is driven by a plurality of double acting hydraulic actuators 350, either linear or rotary as appropriate, provided on the manipulator arm 1 and connected to variable rate hydraulic solenoid valves mounted on a valve manifold 300. The valve manifold 300 is provided on the ROV 220, along with a source of pressurised hydraulic fluid (usually an electric pump connected to a reservoir of hydraulic fluid). A manipulator or slave arm controller 200 is provided adjacent the valve manifold 300 for controlling the actuation of each variable rate valve. With this arrangement, there are no electronics or vulnerable wiring on the manipulator arm 1 itself, the actuation means of the manipulator arm 1 being similar to that of the known variable rate systems described above, with the inherent advantages of reliability, low cost and ease of maintenance.

The computer 100 calculates the rate of change of position of each joint of the master arm 10 by differentiating the output signals received from the position sensors 15 of the master arm 10, thus determining the rate or speed of movement of each joint. The computer 100 sends a control signal to the manipulator or slave arm controller 200, provided on the ROV 220, based upon said calculated rate of movement information. Based upon said control signal the slave arm controller 200 controls the operation of the variable rate valves 300 to move each joint of the manipulator or slave arm 1 at a rate or speed proportional to the rate of movement of the corresponding joint of the master arm 10.

The computer 100 includes selectable electronic scaling means whereby the relationship between the rate of movement of the master arm 10 and the resulting rate of movement of the manipulator or slave arm 1 can be varied by the operator between that required for rapid and large movements of the manipulator arm 1 and that required to permit small and accurate movements of the manipulator arm 1 and its object manipulating tool. The master arm 10 can also be provided with control means to selectively freeze the movement of individual joints or groups of joints of the manipulator arm and/or to selectively permit free movement of the master arm 10 without resulting movement of the manipulator arm 1 to enable the master arm to be re-indexed.

The wrist segment of the master arm 10 includes control means for controlling rotation of the object manipulating tool 8 about the tool rotational axis D and for controlling operation of the jaws of thereof. The rotation control may comprise a simple direction switch controlling rotation of the tool in either direction at a fixed rate or may control the rate of rotation of the tool, either by the known variable rate control method whereby the speed of rotation is proportional to the displacement of a control device 80, such as a joystick or thumb wheel, from an index position, or by a proportional rate control whereby the rate of rotation of the tool is proportional to the rate of movement of a control device 80 e.g. a thumbwheel or rotatable section. The control of the jaws of the tool may be controlled by a simple two way switch.

In one embodiment the tool rotation control and jaw control may be integrated into a single joystick whereby movement of the joystick in a first plane (e.g. forwards and backwards) causes opening and closing of the jaws of the tool and movement in a plane normal to the first plane (e.g. side to side) causes rotation of the tool about the wrist axis.

In an alternative embodiment (not shown), the sensors 15 can be speed sensors provided on each joint of the master arm 10 to directly measure the rate of movement of each joint of the master arm 10, thus obviating the need to differentiate position information and simplifying the control algorithms of the computer 100.

In another embodiment, a master controller other than a master arm might be used, such as one or more joysticks. The master controller would be moveable to replicate the movement of each joint (degree of freedom) of the manipulator arm to be controlled, the control system including means for determining the rate of movement of the master controller in each direction replicating joint of the manipulator arm, either by directly measuring the rate of movement of the master controller or by sensing the position of the master controller and calculating the rate of movement thereof from the positional information. The computer 100 and manipulator arm controller 200 would control actuation of the valves of the valve manifold 300 to control movement of the manipulator arm whereby the rate of movement of each joint of the manipulator arm to be controlled is proportional to the rate of movement of the master controller in the corresponding direction.

Whilst the present invention has been described applied to a manipulator arm for use on an ROV in a subsea environment, the control system according to the present invention may also be advantageously applied to a control manipulator arm in a variety of other applications, such as in the nuclear industry to operate in areas exposed to high levels of radiation and in extra-terrestrial applications or any other application where manipulator arms may be used.

In addition to hydraulic actuators, the control system of the present invention may be utilised to control manipulator arms having other actuation means, such as electric drives (e.g. servomotors, stepper motors) or pneumatic drives (i.e. air driven actuators).

The invention claimed is:

1. A control system for controlling an articulated manipulator arm by way of a master arm, the manipulator arm having a plurality of arm segments interconnected by joints and at least three degrees of freedom including at least two of a pivot axis, a rotational axis, and a translational axis, the master arm having a plurality of arm segments interconnected by joints, each joint of the master arm corresponding to a joint of the manipulator arm, the master arm having at least three degrees of freedom corresponding to the at least three degrees of freedom of the manipulator arm such that the movement of the master arm can replicate movement of the manipulator arm, the manipulator arm being articulated by a plurality of hydraulic actuators to move the manipulator in each of its at least three degrees of freedom, each hydraulic actuator being connectable to a source of pressurized hydraulic fluid, the control system comprising:

a computer configured to determine the rate of movement of the master arm in each direction replicating a degree of freedom of the manipulator arm; and a controller configured to control actuation of the manipulator arm based on the determined rate of the master arm without a closed control loop for providing positional feedback from the manipulator arm, wherein the master arm is operable to selectively deactivate the controller to permit movement of the master arm without causing corresponding movement of the manipulator arm, and whereby the rate of movement of the manipulator arm in each of said at least three degrees of freedom is proportional to the rate of movement of the master arm in each direction replicating a degree of freedom of the manipulator arm.

2. A control system as claimed in claim 1 further comprising, for each joint of the master arm corresponding to a joint of the manipulator arm:

a position sensor coupled to the computer, the position sensor configured to sense the relative position of the segment of the master arm on one side of the joint; and the computer calculates the rate of movement of said segments about said joint to determine the rate of movement of the master arm about the joint of the master arm replicating a joint of the manipulator.

3. A control system as claimed in claim 2, further comprising a differentiator for differentiating the position data from the position sensor.

4. A control system as claimed in claim 1 further comprising a sensor configured to sense the speed of movement of the master arm in each direction replicating a degree of freedom of the manipulator arm.

5. A control system as claimed in claim 1 further comprising a variable rate valve coupled to the controller for controlling the flow of hydraulic fluid from the source of pressurized fluid to each hydraulic actuator, the controller controlling actuation of the manipulator arm by controlling the opening and closing of the variable rate valves to control the rate of movement of the manipulator arm in proportion to the determined rate of movement of the master arm.

6. A control system as claimed in claim 1 wherein the manipulator arm has at least four degrees of freedom.

7. A control system as claimed in claim 1 wherein the manipulator arm has at least six degrees of freedom comprising a shoulder yaw, a shoulder pitch, an elbow pitch, a forearm rotation, a wrist pitch and a wrist rotation, the master arm comprising an articulated master arm having at least five degrees of freedom corresponding to the shoulder yaw, shoulder pitch, elbow pitch and forearm rotation of the manipulator arm.

8. A control system as claimed in claim 1 further comprising a control device configured to control operation of an object manipulating tool provided at a distal end of the manipulator arm.

9. A control system as claimed in claim 7, further comprising a control device configured to control operation of an object manipulating tool provided at a distal end of the manipulator arm which also controls the wrist rotation of the manipulator arm.

10. A control system as claimed in claim 9, wherein the control device comprises a single joystick mounted on a distal end of the master arm to permit one handed operation of the master arm.

* * * * *